(12) United States Patent
Uchida

(10) Patent No.: US 6,775,476 B2
(45) Date of Patent: Aug. 10, 2004

(54) CAMERA SYSTEM, VIBRATION CORRECTION UNIT INTERCHANGEABLE LENS UNIT AND CAMERA

(75) Inventor: Mineo Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 10/320,025

(22) Filed: Dec. 16, 2002

(65) Prior Publication Data

US 2003/0118335 A1 Jun. 26, 2003

(30) Foreign Application Priority Data

Dec. 21, 2001 (JP) .................................... 2001-389350

(51) Int. Cl.[7] .......................................... G03B 17/00
(52) U.S. Cl. ........................................................ 396/55
(58) Field of Search .................. 396/52, 55; 348/208.7, 348/208.8, 208.11, 360

(56) References Cited

U.S. PATENT DOCUMENTS 5,740,472 A * 4/1998 Hirano ........................ 396/55
5,745,801 A * 4/1998 Taguchi ...................... 396/55
5,748,993 A * 5/1998 Shiomi ....................... 396/52

* cited by examiner

Primary Examiner—W. B. Perkey
(74) Attorney, Agent, or Firm—Robin, Blecker & Daley

(57) ABSTRACT

A camera system is disclosed, which comprises a camera having a vibration detection unit which detects vibration, and a vibration correction unit which is attachable to the camera and has a vibration correction optical system which corrects image vibration and a driving control circuit which drives the vibration correction optical system based on a vibration detection signal from the vibration detection unit. The camera intermittently transmits the vibration detection signal from the vibration detection unit and time-related data to the driving control circuit. The driving control circuit receives the vibration detection signal and the time-related data. The driving control circuit drives the vibration correction optical system based on a previously received vibration detection signal or a currently received vibration detection signal selected on the basis of the received time-related data.

16 Claims, 13 Drawing Sheets

CAMERA SYSTEM, VIBRATION CORRECTION UNIT INTERCHANGEABLE LENS UNIT AND CAMERA

BACKGROUND OF THE INVENTION

1. Field of the Invention

The present invention relates to an improvement of a camera system having a correcting image vibration function.

2. Description of the Related Art

A conventionally well-known vibration correction function in a camera system is configured such that an interchangeable lens contains a vibration sensor for detecting camera shake, and a vibration correction optical system formed of all or some of an image-taking optical system is driven in response to output from the vibration sensor.

In addition, various proposals have been made for an image vibration correction system having a vibration sensor in a camera and a correction optical system in a lens in which vibration information is transmitted from the camera to the lens through a signal line to control the vibration correction in the lens based on the transmitted data, for example in Japanese Patent Application Laid-Open No. 7-191354 (U.S. Pat. No. 6,088,533).

Such an image vibration correction system having a vibration sensor in a camera and a correction optical system in a lens as mentioned above is based on the premise that data of vibration detected by the vibration sensor in the camera or a signal for driving the correction optical system is transmitted to the lens at regular intervals. The actual working of a camera working, however, involves a number of control operations other than vibration correction, such as an autofocus operation, so that it is not necessarily possible to continue the transmission of the vibration data to the lens at regular intervals. In this event, if vibration data transmitted after some delay is used in calculations to drive the correction system, the control of the correction system which should be performed at regular intervals is delayed, and also, the resultant correction amount may be different from an amount which should actually be used for correction since the calculations of the correction amount is premised on correction performed at regular intervals.

SUMMARY OF THE INVENTION

It is an object of the present invention to provide a camera system which can prevent against deteriorated accuracy of vibration correction even when vibration data cannot be transmitted to a vibration correction unit at regular intervals.

The present invention is characterized by a camera system comprising: a camera having as a vibration detection unit which detects vibration, and a vibration correction unit which is attachable to the camera and has a vibration correction optical system which corrects image vibration and a driving control circuit which drives the vibration correction optical system based on a vibration detection signal from the vibration detection unit. The camera intermittently transmits the vibration detection signal from the vibration detection unit and time-related data to the driving control circuit, and the driving control circuit receives the vibration detection signal and the time-related data.

The present invention is also characterized in that the driving control circuit drives the vibration correction optical system based on a previously received vibration detection signal or a currently received vibration detection signal selected on the basis of the received time-related data.

The present invention is also characterized in that the time-related data is time data which represents a delay time period after a predetermined timing at which the camera should essentially transmit the vibration detection signal to the driving control circuit. The driving control circuit drives the vibration correction optical system based on the currently received vibration detection signal when the time data is equal to or smaller than a predetermined value, and drives the vibration correction optical system based on the previously received vibration detection signal when the time data is larger than the predetermined value.

The present invention is also characterized in that the vibration correction unit and the driving circuit are included in an interchangeable lens unit having an image-taking optical system.

In addition, the present invention is characterized by a camera system comprising: a camera having a vibration detection unit which detects vibration, and an interchangeable lens unit which is attachable to the camera and has a vibration correction optical system which corrects image vibration and a driving control circuit which drives the vibration correction optical system based on a vibration detection signal from the vibration detection unit. The camera intermittently transmits the vibration detection signal from the vibration detection unit and time-related data to the driving control circuit, and the driving control circuit receives the vibration detection signal and the time-related data.

Further, the present invention is characterized by a vibration correction unit attachable to a camera having a vibration detection unit which detects vibration, comprising: a vibration correction optical system which corrects image vibration; and a driving control circuit which drives the vibration correction optical system based on a vibration detection signal from the vibration detection unit. The driving control circuit receives the vibration detection signal and time-related data transmitted intermittently from the camera.

Further, the present invention is characterized by an interchangeable lens attachable to a camera having a vibration detection unit which detects vibration, comprising: a vibration correction optical system which corrects image vibration; and a driving control circuit which drives the vibration correction optical system based on a vibration detection signal from the vibration detection unit. The driving control circuit receives the vibration detection signal and time-related data transmitted intermittently from the camera.

Further, the present invention is characterized by a camera to which a vibration correction unit or an interchangeable lens can be attached. The vibration correction unit or the interchangeable lens has a vibration correction optical system which corrects image vibration and a driving control circuit which drives the vibration correction optical system. The camera comprising: a vibration detection unit which detects vibration; and a camera control circuit which intermittently transmits a vibration detection signal from the vibration detection unit and time-related data to the driving control circuit.

Additional characteristics of the present invention will be apparent from the following description with reference to the accompanying drawings.

DESCRIPTION OF THE PREFERRED EMBODIMENTS

The present invention is hereinafter described in detail on the basis of an embodiment shown in the accompanying drawings.

Figure 1:
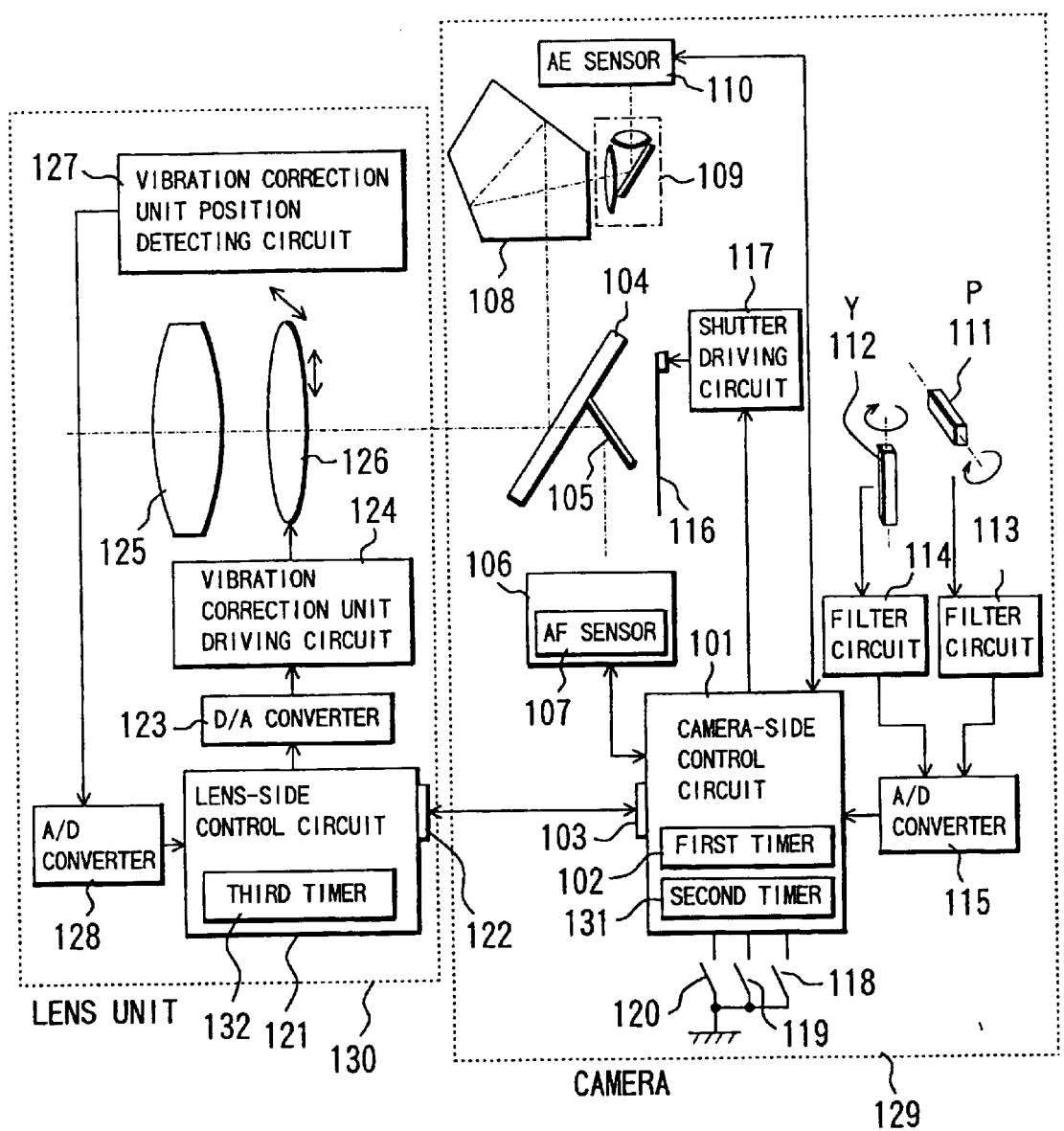
FIG. 1 is a block diagram showing the configuration of a camera system according to an embodiment of the present invention.

FIG. 1 is a block diagram generally showing the configuration of a camera 129 and an interchangeable lens unit 130 including a vibration correction unit according to an embodiment of the present invention.

In FIG. 1, reference numeral 101 shows a camera-side control circuit responsible for the sequence of a camera 129 in its entirety. A sensor 111 detects vibration (shake) of the whole camera in a pitch direction and provides an output representing the vibration through a filter circuit 113 to an A/D converter 115 which in turn converts the output into digital data. The digital data is input to the camera-side control circuit 101. Similarly, an output from a vibration sensor 112 (for detection in a yaw direction) is input to the A/D converter 115 through a filter circuit 114. The digital data is input to the camera-side control circuit 101. The vibration sensors 111, 112 and the filter circuits 113, 114 are formed of a vibration gyro as an angular velocity sensor and an integrator circuit as shown in FIG. 2, as an example of their specific configuration.

Figure 2:
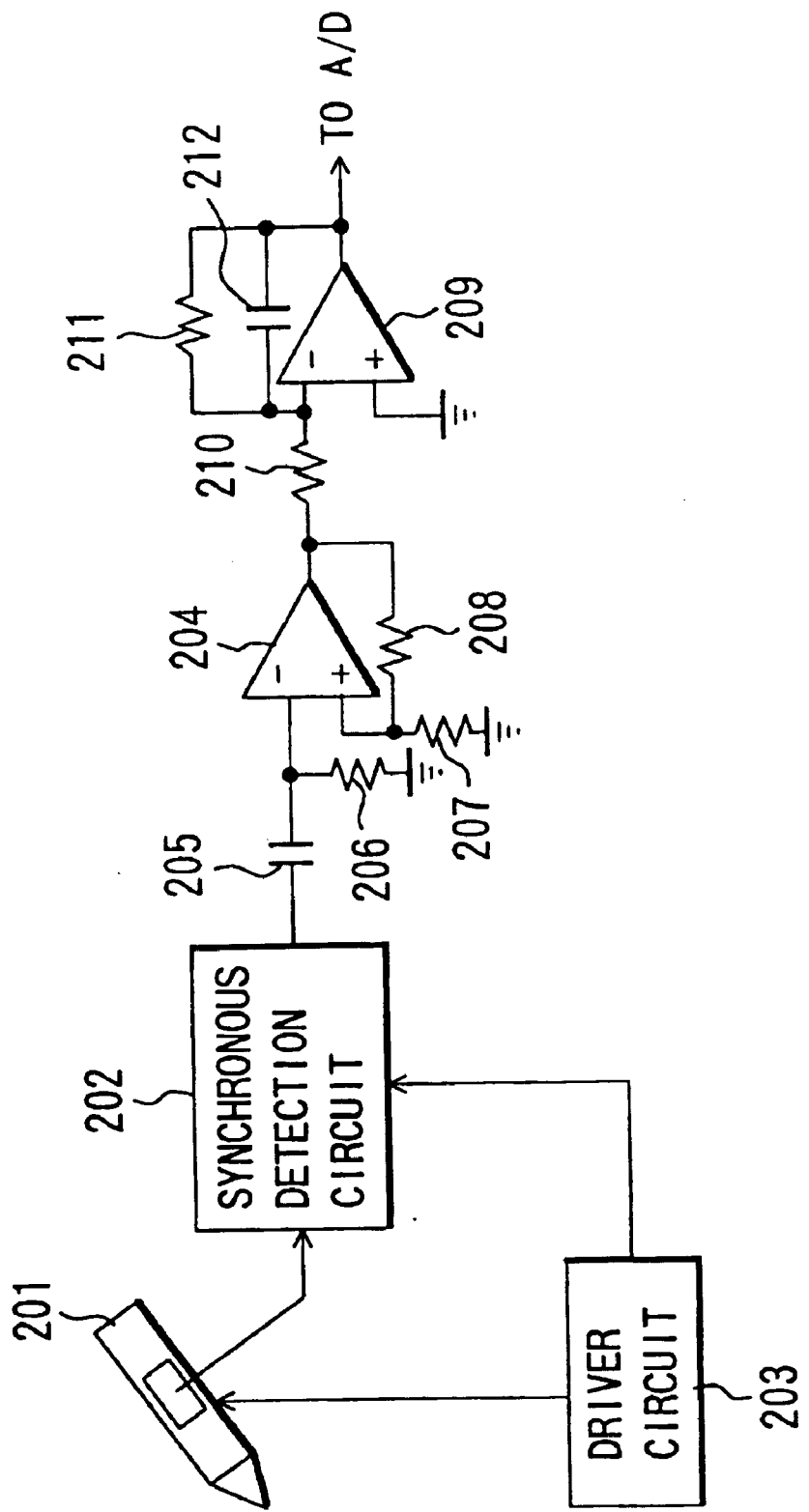
FIG. 2 shows the configuration of an angular velocity sensor of the camera system according to the embodiment of the present invention.

In FIG. 2, a vibration gyro 201 is resonance-driven by a driving circuit 203 and provides an output which is converted into a predetermined angular velocity output by a synchronous detection circuit 202 or the like. An output from the synchronous detection circuit 202 typically includes an unnecessary DC offset. The DC component is removed by a high-pass filter formed of a capacitor 205 and a resistor 206, and only the remaining vibration signal is amplified by an amplification circuit formed of an operational amplifier 204 and resistors 207 and 208. An output from the amplification circuit is then integrated by an integrating circuit formed of an operational amplifier 209, resistors 210 and 211, and a capacitor 212 for conversion into an output proportional to a vibration displacement. The integrated output is connected to the A/D converter 115 as described above.

Returning to FIG. 1, the camera-side control circuit 101 has therein a first timer 102 for setting the timing to read data from the A/D converter 115 at regular intervals to perform calculations for vibration correction, and a second timer 131 for providing the timing to transmit the result of the calculations for vibration correction to a lens-side control circuit 121 through a camera-side contact 103 for serial communication between the camera 129 and lens unit 130.

On the other hand, light from an object is incident on a half-mirror type main mirror 104 through an image-taking optical system formed of an image-taking lens 125 and a vibration correcting lens 126, which constitute an image-taking optical system. Light reflected by the main mirror 104 passes through a prism 108 which directs a part of the light to a viewfinder optical system, not shown, and the remaining part of the light to an AE sensor 110 for performing photometric measurements through a photometric lens unit 109. The camera-side control circuit 101 performs exposure control such as calculations of a shutter speed and an F number based on luminance information from by the AE sensor 110.

The light passing through the main mirror 104 is reflected by a sub mirror 105 and incident on an AF (autofocus) unit 106 includes a field lens and an AF sensor 107. The camera-side control circuit 101 performs a distance measurement based on image information from the AF sensor 107.

A shutter 116 (composed of a front curtain and a rear curtain) is subjected to timing control by a control signal from the camera-side control circuit 101 through a shutter driving circuit 117.

The lens-side control circuit 121 is responsible for the sequence of a lens unit 130. The result of the calculations for vibration correction transmitted from the camera 129 through serial communication is input to the lens-side control circuit 121 from a contact 122. The lens-side control circuit 121 calculates a driving amount of the vibration correcting lens 126 based on the received data and the current position data of the vibration correcting lens 126 and outputs the result to a D/A converter 123. The lens-side control circuit 121 has a third timer 132 for setting the timing to output the driving amount data for vibration correction to the D/A converter 123 such that the vibration correction unit is driven at regular intervals. The D/A converter 123 outputs an analog voltage proportional to the data input thereto. The output voltage is input to a vibration correction unit driving circuit 124 to drive the vibration correcting lens 126 in directions orthogonal to the optical axis of the image-taking lens 125, indicated by arrows.

Figure 3:
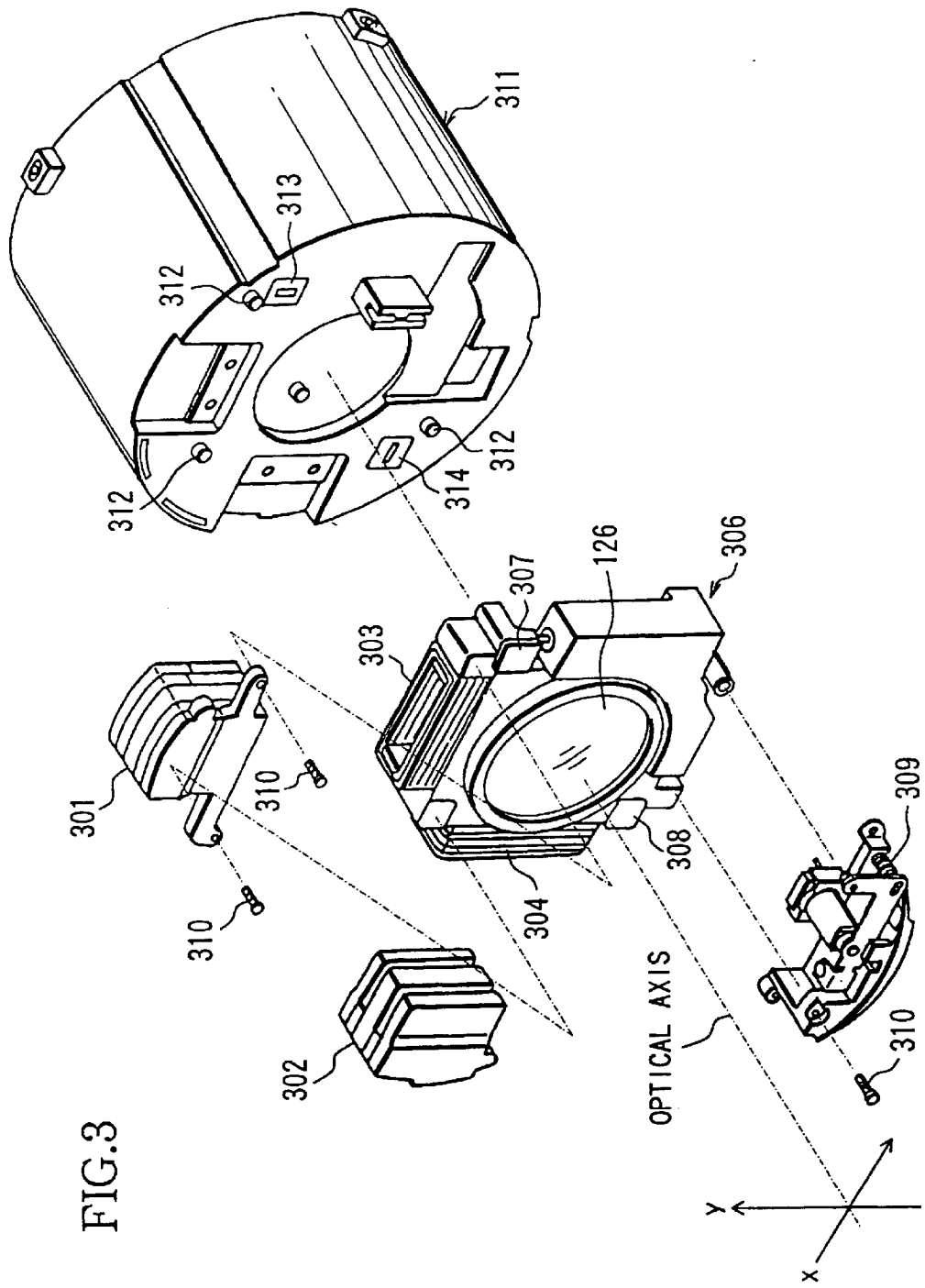
FIG. 3 specifically shows the configuration of a vibration correction unit of the camera system according to the embodiment of the present invention.

The specific configuration of the vibration correction unit is shown in FIG. 3.

The vibration correction unit which corrects image vibration by the shifting of the vibration correcting lens 126 in x, y directions orthogonal to the optical axis.

In FIG. 3, reference numerals 301 and 302 show yokes as magnetic circuit units serving as actual driving source in the x, y axis directions. Reference numerals 303 and 304 show coils corresponding to the respective yokes 301 and 302. Reference numeral 306 shows a support frame for supporting the vibration correcting lens 126 and the coils 303 and 304. The coils 303 and 304 are supplied with an electric current from the vibration correction unit driving circuit 124 to drive the vibration correcting lens 126 in the x, y directions.

In turn, the movement of the vibration correcting lens 126 is detected in a noncontact manner by a combination of IREDs 307 and 308 movable together with the lens 126 and PSDs 313 and 314 attached onto a barrel portion 311 for holding the entire vibration correction unit. Reference numeral 309 shows a mechanical lock mechanism for mechanically holding the vibration correction lens 126 substantially at the center of the optical axis when vibration correction is stopped. Reference numeral 310 shows a charge pin, and 312 support balls serving as a stopper for regulating tilt directions of the vibration correcting lens 126.

Returning again to FIG. 1, the current position of the vibration correcting lens 126 is detected by a vibration correction unit position detection circuit 127. An output therefrom is read by the lens-side control circuit 121 through an A/D converter 128. The camera 129 also has switches 118 (SW1) and 119 (SW2) associated with the operation of a release button (not shown), and a switch 120 (ISSW) for setting whether or not vibration correction is performed.

Figure 4:
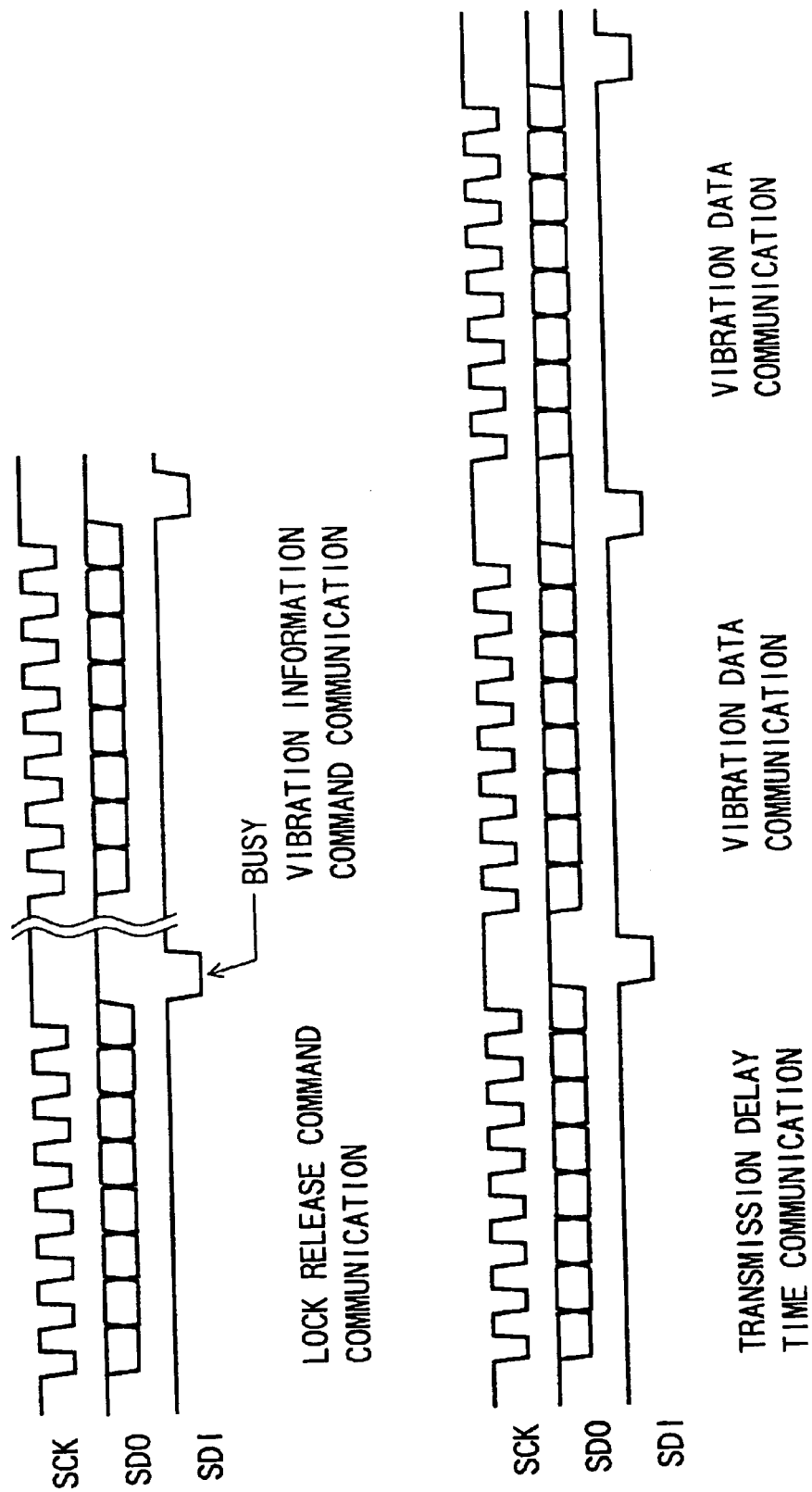
FIG. 4 shows a timing chart of the communication in the camera system according to the embodiment of the present invention.
Figure 5:
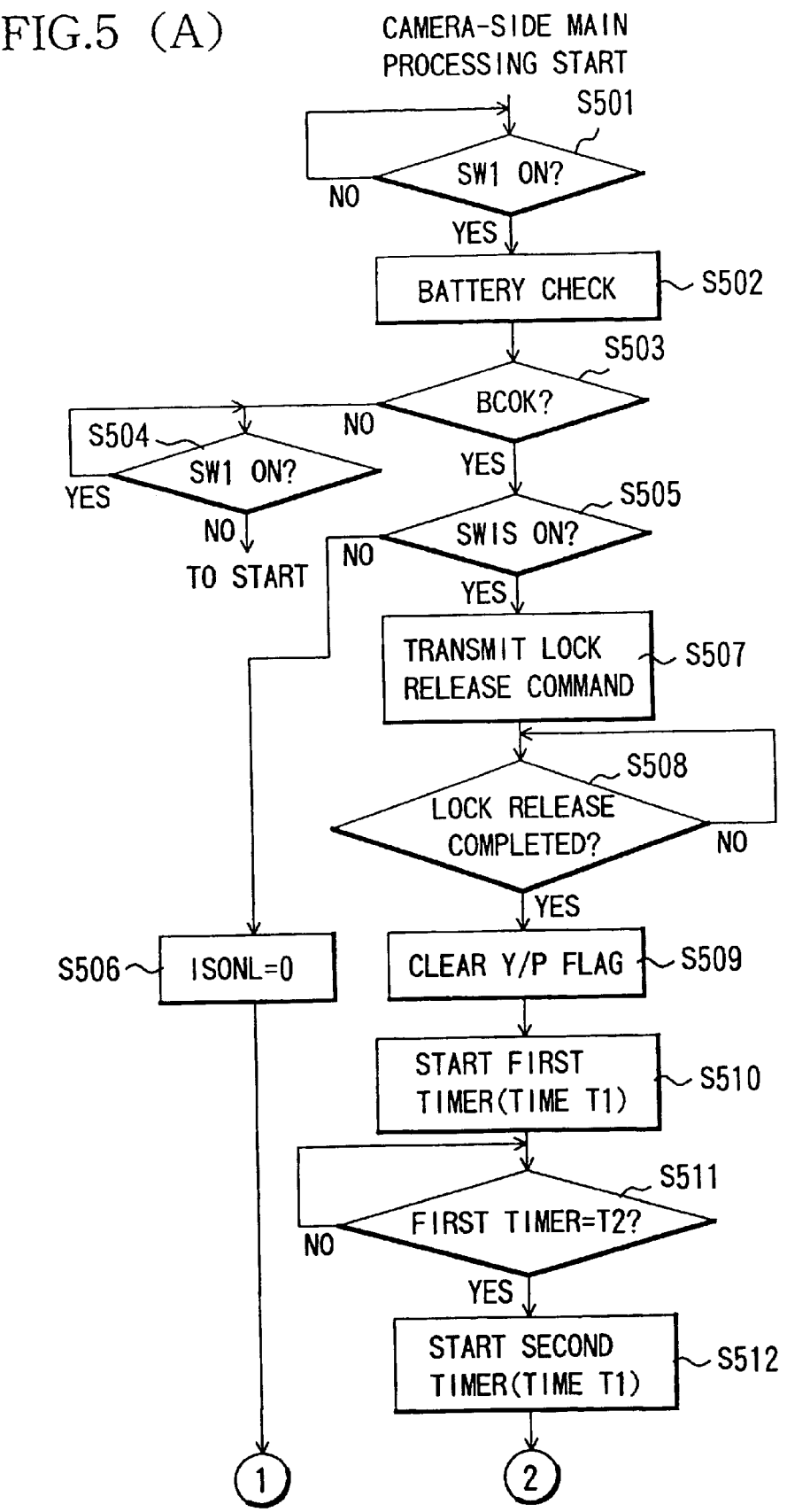
FIGS. 5(A) and 5(B) show a flow chart of the operation of camera-side main processing in the camera system according to the embodiment of the present invention.
Figure 5:
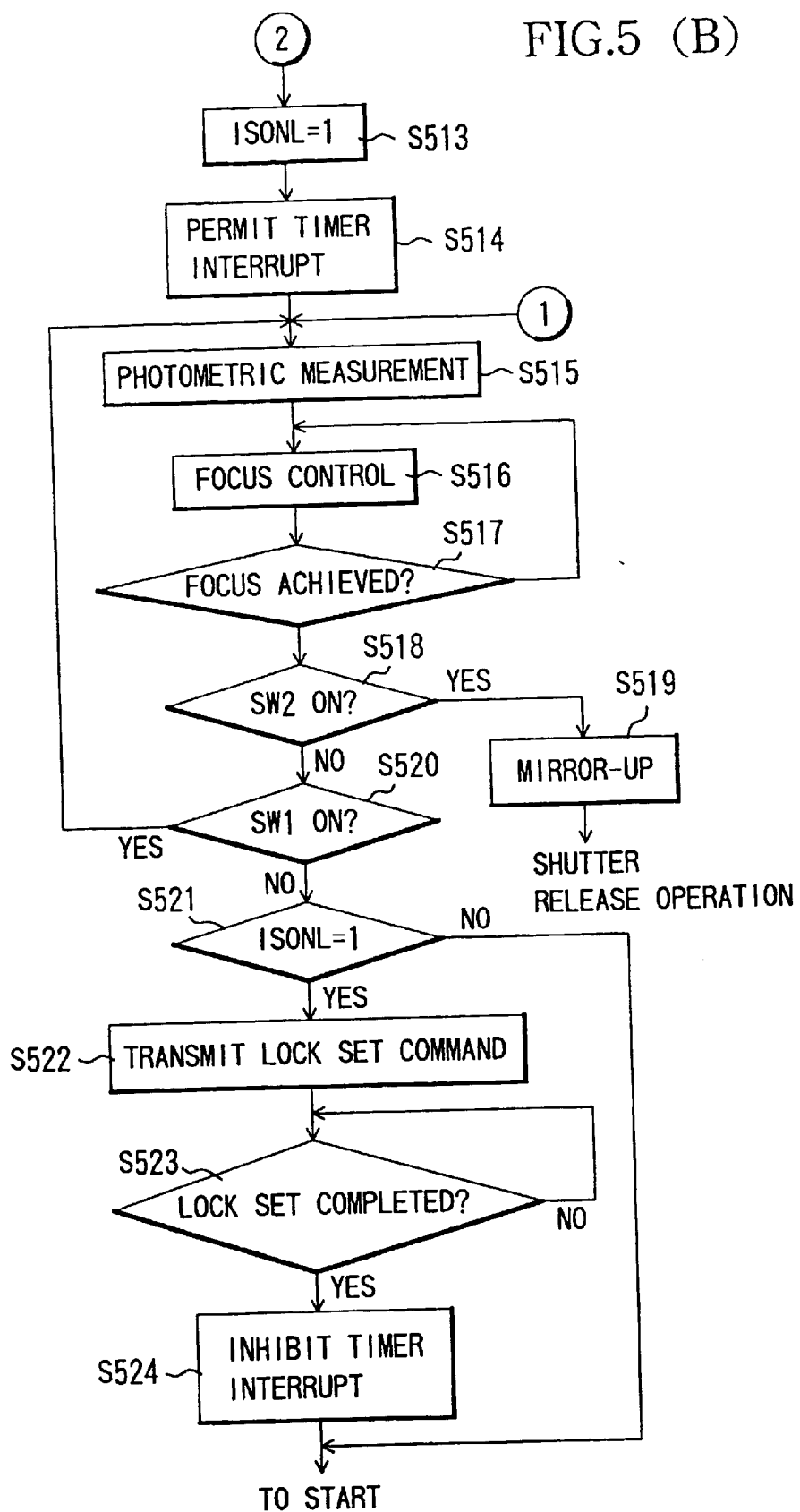

Next, description is made for how control is performed specifically with reference to flow charts shown in FIGS. 5 to 11, a timing chart shown in FIG. 4, and the like.

FIGS. 5(A) and 5(B) show a main flow illustrating the control operations of the camera-side control circuit 101 associated with vibration correction. In FIGS. 5(A) and 5(B), lines with the same circled numerals connect with each other. In FIG. 5(A), at step S501, it is determined whether or not the switch SW1 (118) of the camera 129 is turned on in association with a release start operation. When it is turned on, the flow proceeds to steps S502 and S503 where a battery check circuit, not shown, determines whether or not supply voltage is sufficient for ensuring the operation of the whole camera 129. When the result of this determination shows that the supply voltage is not sufficient, the flow proceeds to step S504 to wait for turn-off of the switch SW1. When it is determined that the switch SW1 is turned off, the flow returns to the start position.

When it is determined that the supply voltage is sufficient at step S503 described above, the flow proceeds to step S505 where it is determined whether or not the switch SWIS (120) is turned on. When the switch SWIS is turned off, it is determined that a vibration correction operation is not needed and the flow proceeds to step S506 where an internal flag ISONL is reset to zero, and the flow immediately proceeds to step S515. On the other hand, when it is determined that the switch SWIS is turned on at step S505 described above, it is also determined that an image-taking operation with vibration correction should be selected and the flow proceeds to step S507 where a lock release command is transferred from the camera-side control circuit 101 to the lens-side control circuit 121 through a serial bus line.

FIG. 4 shows a timing chart showing the command communications. In FIG. 4, SCK represents a synchronous clock for serial communication, SDO serial data transferred from the camera 129 to the lens unit 130, and SDI serial data transferred from the lens unit 130 to the camera 129 at the same time.

As in FIG. 4, when a command for mechanical lock release of at least one byte is transmitted to the lens unit 130 from the camera 129, a BUSY signal indicating reception of the data is detected in SDI. This causes the camera-side control circuit 101 to determine at step S508 in FIG. 5(A) that the mechanical lock release operation of the vibration correcting lens 126 is completed (actually the completion of the mechanical lock release operation is delayed a little, but the release can be considered as completed when the command reception is completed in terms of the sequence), and the flow proceeds to step S509.

At step S509, a Y(yaw)/P(pitch) flag for determining whether interrupt processing is for the yaw or pitch direction is cleared. At subsequent step S510, the first timer 102 starts counting for an interrupt operation performed at predetermined intervals T1. At step S511, the control waits until the first timer counts to a predetermined time T2 (T2<T1), then the flow proceeds to step S512 where the second timer 131 starts counting for providing transmission timing of vibration data. The predetermined time T2 is a time period which is expected to be spent from the start of an interrupt operation (later described) by the first timer 102 to the transmission of vibration data in the interrupt operation. In other words, the second timer 131 counts the time elapsed since the predetermined timing (T2) at which the vibration data should be essentially transmitted. The second timer 131 is cleared at regular intervals T1 to repeat counting.

At the next step S513, the ISONL in the camera-side control circuit 101 is set to one for indicating a vibration correction operation status. At subsequent step S514, the interrupt operation of the timer is permitted. A photometric measurement operation is performed for measuring brightness of an object at step S515, and focus control is performed by driving an optical sensor and a focus lens, not shown, at next step S516. The focus control is continued until optimal focus is detected at step S517, and when optimal focus is detected, the flow proceeds to step S518 where it is determined whether or not the switch SW2 (119) of the camera 129 is turned on for release operation of the shutter 116.

When turn-on of the switch SW2 is detected at step S518 described above, it is determined that a photographer starts an actual release operation and the flow proceeds to step S519 where mirror-up operation is performed in the main mirror 104 of the camera 129 shown in FIG. 1.

On the other hand, when it is determined that the switch SW2 is not turned on yet at step S518 described above, it is further determined that the photographer is performing a framing operation (considering the composition of an image) and the flow proceeds to step S520. When it is determined that the switch SW1 is still turned on at step S520, the flow returns to step S515 to repeat the aforementioned operations. However, when it is determined that the switch SW1 is turned off at step S520 described above, the camera-side control circuit 101 determines that the photographer ends the image taking with the camera 129, and the flow proceeds to step S521 where the value of the aforementioned flag ISONL is determined.

When the value of the ISONL is zero at step S521, it is determined that the vibration correction operation has not been started and the flow immediately returns to step S501. When the ISONL is one, it is determined that the vibration correction operation has been started and the flow proceeds to step S522 where a lock set command is transmitted. The lock set command is transmitted from the camera-side control circuit 101 to the lens-side control circuit 121 as in the timing chart shown in FIG. 4, that is similar to the aforementioned lock release command (its data content is different).

It is determined whether or not the lock set of the vibration correcting lens 126 is completed at the next step S523. When the lock set completion is detected, an interrupt operation by the first timer 102 is inhibited at step S524 to end a series of the operations.

Figure 6:
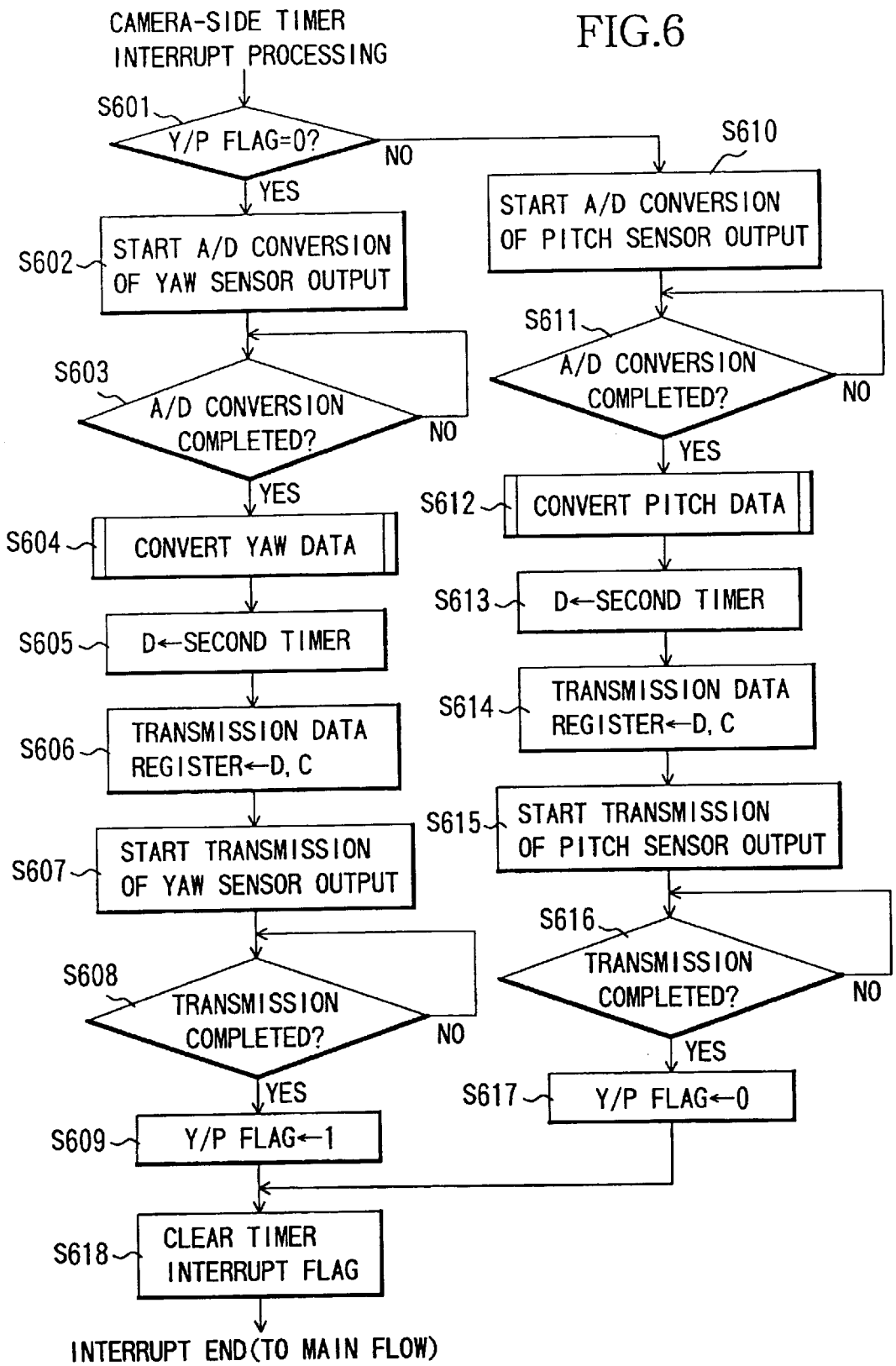
FIG. 6 shows a flow chart of the operation of camera-side timer interrupt processing in the camera system according to the embodiment of the present invention.

Next, a description is made of the control function in an interrupt operation performed at regular intervals T1 counted by the first timer 102 with reference to a flow chart shown in FIG. 6.

When the interrupt is started, it is determined first at step S601 whether the present processing is for the yaw direction or the pitch direction based on the value of the Y/P flag. When the result of the determination shows that the Y/P flag is set to one, the flow proceeds to step S610 to start processing for the pitch direction. Since steps S610 to S617 corresponding to the processing for the pitch direction are identical to a series of processing steps S602 to S609 for the yaw direction, next described, the description for the pitch direction is omitted.

When it is determined that the Y/P flag is zero at step S601 described above, it is considered that processing for the yaw direction is performed in the present interrupt and the flow proceeds to step S602. At step S602, the A/D converter 115 starts to convert an output from the vibration sensor 112 in the yaw direction shown in FIG. 1 into digital data. When the completion of the conversion is detected at the next step S603, the flow proceeds to step S604 where the result of the conversion is subjected to predetermined calculations.

Figure 10:
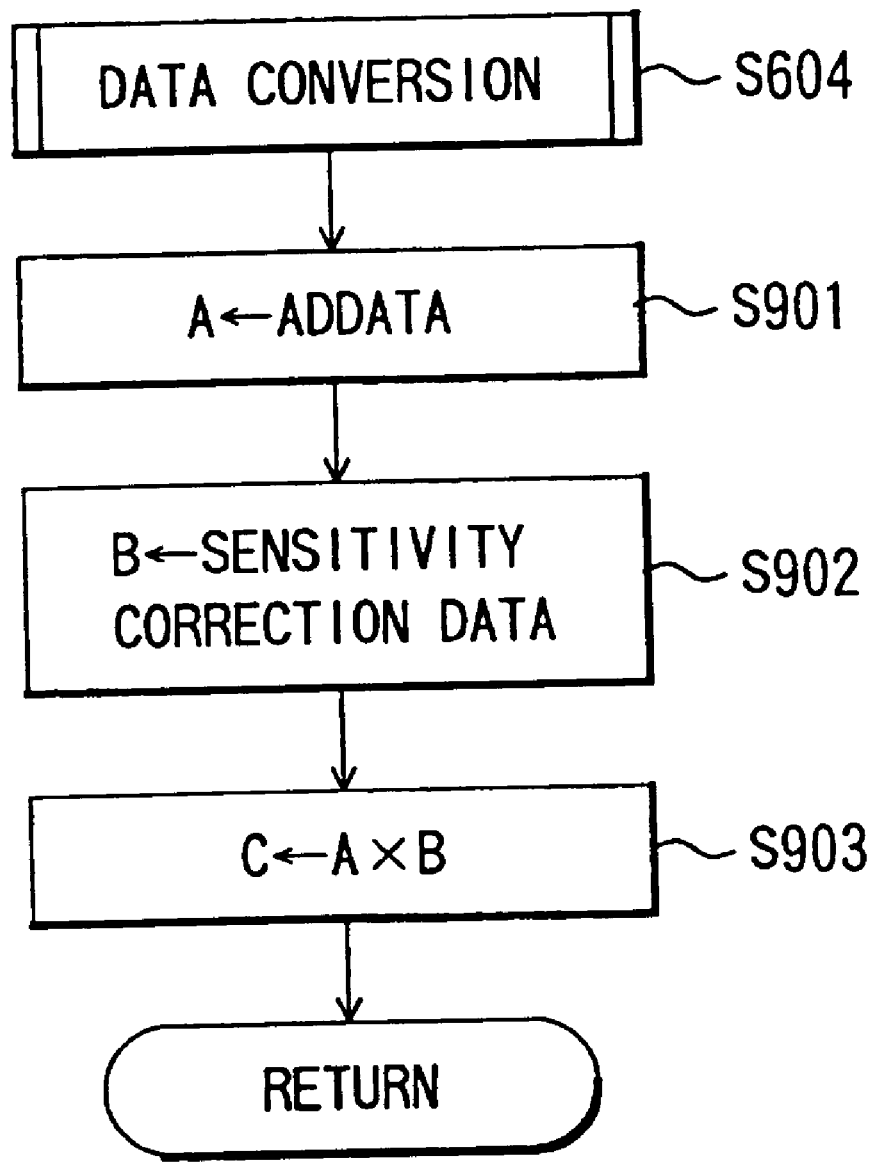
FIG. 10 shows a flow chart of the operation of a data conversion subroutine on vibration data in the camera system according to the embodiment of the present invention.

The data conversion operation (S604) is now described with reference to a data conversion subroutine shown in FIG. 10.

In the operation of the data conversion subroutine, first, the content in an ADDATA register for storing the result of the A/D conversion is transferred to a general calculation register A in the camera-side control circuit 101 at step S901. At next step S902, data for correcting sensitivity of each vibration sensor is similarly transferred to a general calculation register B. Finally, at step S903, the data contents from the aforementioned two general calculation registers A and B are multiplied together and the result is set in a register C.

At subsequent step S605, the value of the second timer is then transferred to a register D. The second timer 131 counts the time elapsed since the predetermined timing (at which the first timer 102 counts to T2) at which vibration data should be essentially transmitted. Thus, the value transferred to the register D at this time corresponds to a delay time after the predetermined timing at which vibration data should be essentially transmitted. At step S606, the contents of the register D and the register C are transferred to a transmission data register, and an actual transmission operation is performed at step S607.

The actual transmission is performed as in the timing chart shown in FIG. 4 in the order of the command indicating that vibration information is transmitted (the command includes the flag for determining the yaw, pitch or the like), one byte of the content of the register D indicating the delay time after the timing at which vibration data should be essentially transmitted, and then serial data of at least one byte of the content of the register C corresponding to vibration data.

Returning to FIG. 6, when it is determined that the data transfer is completed at step S608, the Y/P flag is set to one at step S609. Finally, a timer interrupt flag associated with this operation is cleared to zero at step S618 to complete the interrupt operation, and the flow returns to the main flow shown in FIGS. 5(A) and 5(B).

As described above, in the processing of the camera-side control circuit 101, an interrupt occurs at regular intervals T1 to alternately perform the sampling of the outputs from the vibration sensors 111 and 112 for the pitch and yaw directions provided in the camera 129 and the calculation processing thereof, and the result (vibration data) and the delay time data of transmission timing are transmitted to the lens unit 130.

Figure 7:
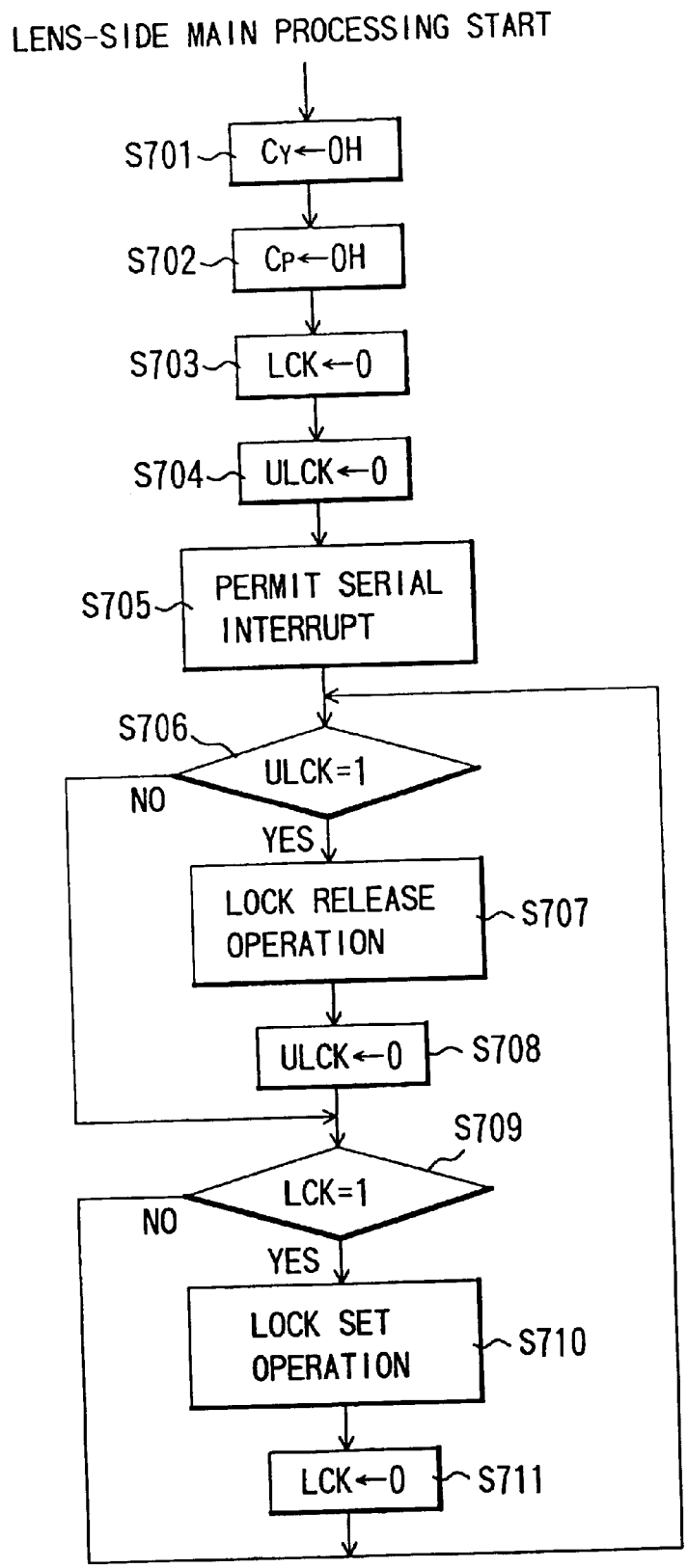
FIG. 7 shows a flow chart of the operation of lens-side main processing in the camera system according to the embodiment of the present invention.
Figure 8:
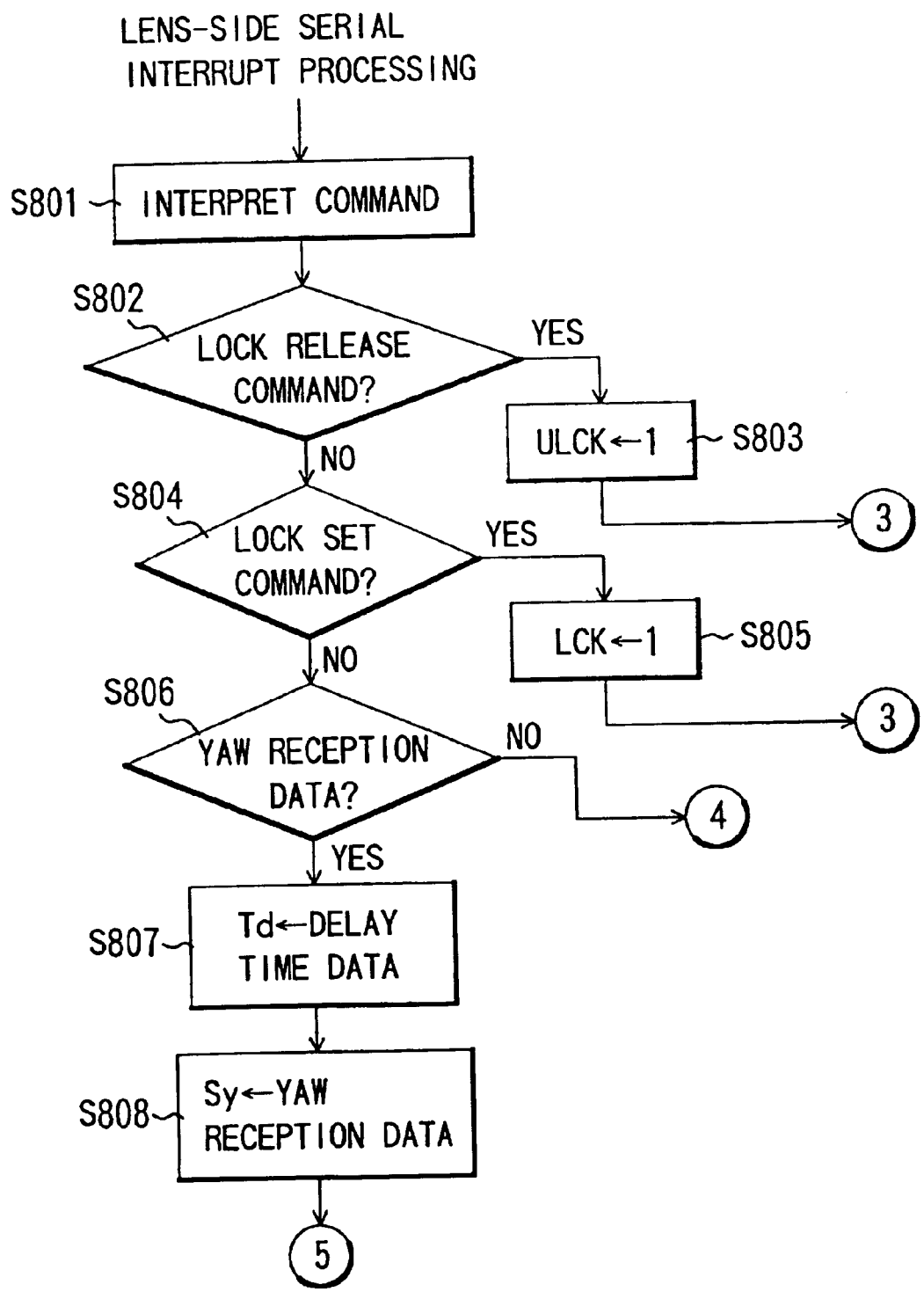
FIGS. 8(A) and 8(B) show a flow chart of the operation of lens-side serial interrupt processing in the camera system according to the embodiment of the present invention.
Figure 8:
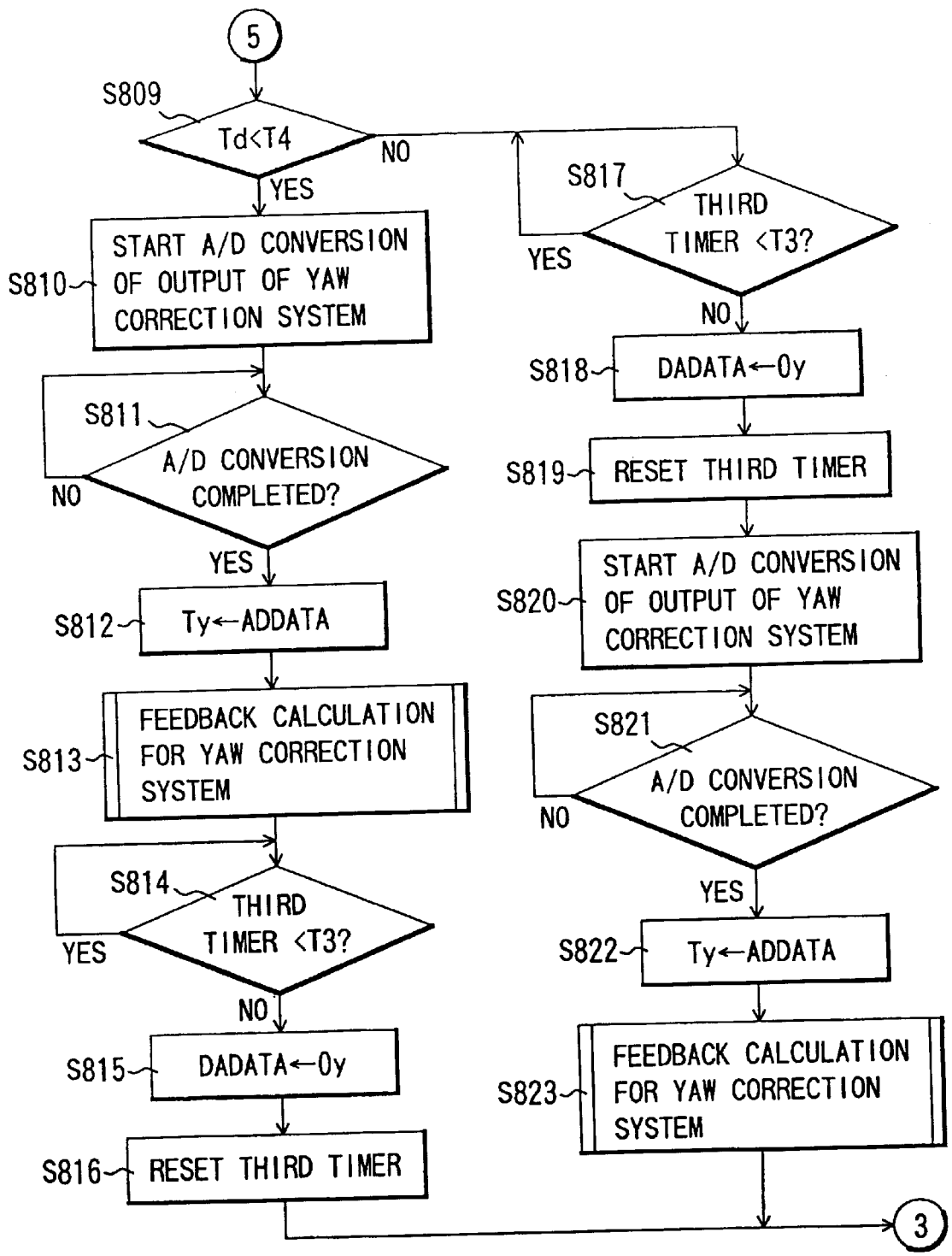
Figure 9:
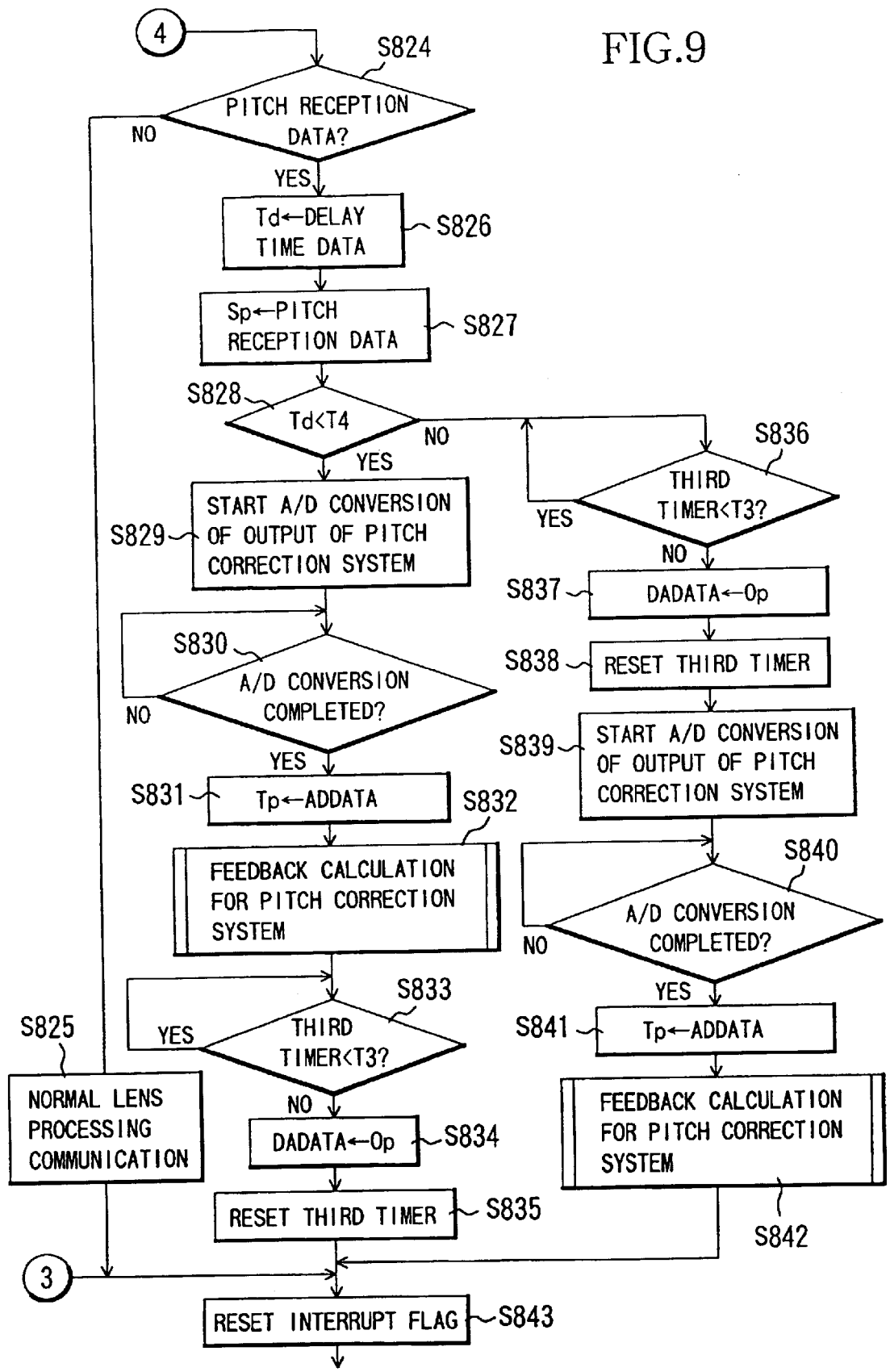
FIG. 9 shows a flow chart of the operation subsequent to the operation in FIG. 8.

Next, description of control operation of the lens-side control circuit 121 is made with reference to flow charts of FIGS. 7 to 9.

FIG. 7 shows a main flow for the lens-side control circuit 121. First, at steps S701 and S702, correction calculation internal registers Cy, Cp for lens control are reset to 0H. At the next step S703, a flag LCK indicating lock set control is reset to zero. Similarly, at step S704, a flag ULCK indicating lock release control is reset to zero. At subsequent step S705, an interrupt operation of a serial interface is permitted for receiving the aforementioned data transmitted from the camera 129.

At step S706, it is determined whether or not a command for prompting lock release is received in interrupt processing in serial interface communication, later described. When the flag ULCK is reset to zero, it is determined that the lock release command is not received and the flow proceeds to step S709. When the flag ULCK is set to one, it is determined that the lock release command is received and the flow proceeds to step S707 to immediately perform a lock release operation of the vibration correcting lens 126. In this event, the lens-side control circuit 121 provides a control signal with which an electric current is passed through a plunger 309 in the mechanical lock mechanism shown in FIG. 3 in a predetermined direction through a mechanical lock driver, not shown, to release the lock of the vibration correcting lens 126. In addition, at step S708, the aforementioned flag ULCK is reset to zero.

Then, the flow proceeds to step S709 where it is determined whether or not the flag LCK indicating the lock set is set to one. When the flag LCK is reset to zero, it is determined that a lock set command is not received and the flow returns to step S706. When the flag LCK is set to one, it is determined that the lock set command is received and the flow proceeds to step S710 to immediately perform a lock set operation of the vibration correcting lens 126. In this event, the lens-side control circuit 121 provides a control signal with which an electric current is passed through the plunger in the mechanical lock mechanism in the opposite direction to that for the aforementioned lock release to forcefully stop the movement of the vibration correcting lens 126 by a lever. Finally, at step S711, the flag LCK is reset to zero, and the flow returns to step S706 to repeat the aforementioned operations.

Next, description is made for how the lens-side serial communication is processed with reference to FIGS. 8(A), 8(B) and 9. In FIGS. 8(A), 8(B) and 9 lines with the same circled numerals connect with each other.

First, at step S801, a command as the communication content transmitted from the camera 129 is interpreted. At the next step S802, it is determined whether or not the communication content is the lock release command. When it is determined that it is the lock release command, the flow proceeds to step S803 where the flag ULCK is set to one for prompting a lock release operation in the lens-side control circuit 121, and the flow immediately proceeds to step S843 where a flag for a serial interrupt is cleared to terminate the interrupt operation. Thus, in this event, the lock release operation is performed in the main flow operation in FIG. 7 as described above.

On the other hand, when it is determined that the command is not the lock release command at step S802, the flow proceeds to step S804. At step S804, it is determined whether it is the lock set command. When it is determined that it is the lock set command, the flag LCK is set to one for prompting the lock set operation in the lens-side control circuit 121 at the next step S805. The flow proceeds to step S843 in FIG. 9 to terminate the interrupt operation similarly to when the lock release command is received.

When it is determined that the command is not the lock set command at step S804, the flow proceeds to step S806. At step S806, it is determined whether or not it is vibration data in the yaw direction. When it is determined that the received command is not a command for receiving yaw data, the flow proceeds to step S824 in FIG. 9. At step S824, it is determined whether or not it is vibration data in the pitch direction. When it is determined that the received command is not coincident with a command for receiving pitch data at step S824, normal lens communication processing (for example, for control of the focus lens and a diaphragm [not shown]) is performed, and after that operation is completed, the flow proceeds to step S843 to terminate the interrupt operation.

When it is determined that the received command is coincident with the command for receiving pitch data at step S824, the flow proceeds to step S826 to start processing for the pitch direction, that is, the processing from steps S826 to S842. Since the series of the processing for the pitch direction is identical to a series of the processing for the yaw direction of steps S807 to S823 in FIGS. 8(A) and 8(B), next described, the description for the pitch direction is omitted.

When it is determined that the received command is coincident with the command for receiving yaw data at step S806 in FIG. 8, the content of serial data in the form as shown in the timing chart of FIG. 4 is set such that a transmission delay time (delay time data) is set in a register Td in the lens-side control circuit 121 and vibration data (received yaw data) is set in a register Sy at steps S807 and S808, respectively.

At the next step S809, the value of Td is compared with a predetermined value T4. T4 represents a time period required for a series of calculation processing from steps S810 to S815, later described. When the value of Td is smaller than T4, the vibration data is transmitted from the camera 129 after a slight delay and it is assumed that there is enough time to perform the series of calculation processing for driving of the vibration correction unit performed at regular intervals. Then, the flow proceeds to step S810 where the A/D converter 128 starts to convert the output from the vibration correction unit position detecting circuit 127 (formed of the IREDs, PSDs and processing circuit) shown in FIG. 1 to digital data. At next step S811, it is determined whether or not the A/D conversion operation is completed. When it is determined that the A/D conversion operation is completed, the flow proceeds to step S812. At step S812, the result is transferred to a register Ty in the lens-side general control circuit 121. At next step S813, feedback calculations are performed for the yaw correction system such that the content of the register Sy for storing the received vibration data is coincident with the content of the register Ty for storing the data corresponding to the output representing the position of the vibration correction unit. How the feed back calculations are performed is described with reference to the flow chart of FIG. 11.

Figure 11:
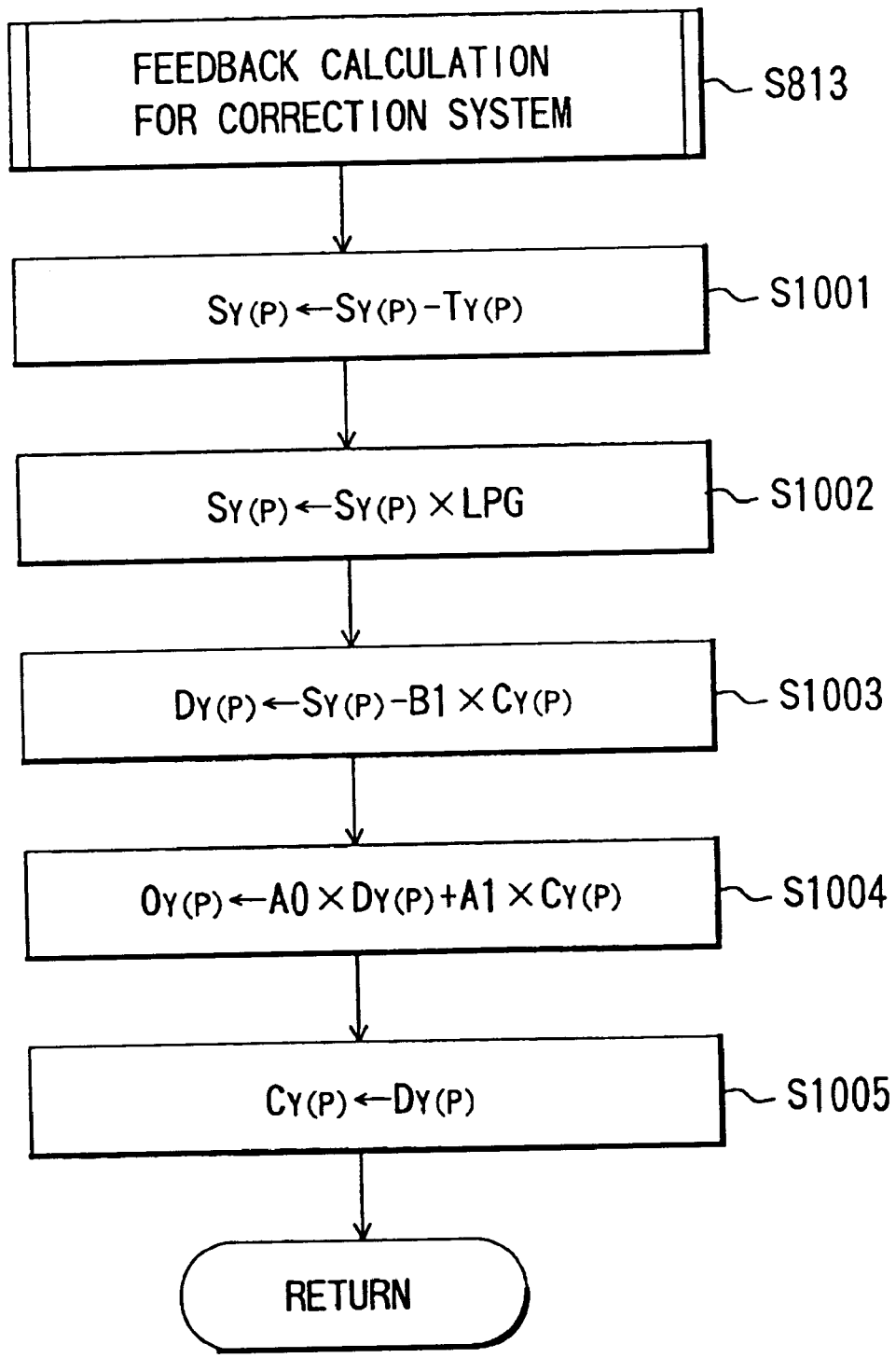
FIG. 11 shows a flow chart of the operation of a feedback calculation subroutine of the vibration correction unit in the camera system according to the embodiment of the present invention.

In FIG. 11, first, at step S1001, the difference between the contents of the aforementioned register Sy (register Sp in the case of the pitch direction) and the register Ty (register Tp in the pitch direction) is set again to the register Sy. At next step S1002, the result is multiplied by predetermined data LPG for determining a loop gain of the feed back control of the vibration correction unit, and the result is set again to the register Sy. Subsequent steps S1003 to S1005 are operations for performing phase compensation calculations (in this event, first-order phase lead compensation) of this system for vibration correction. Values of coefficients B1, A0, and A1 used in the calculations are previously set as predetermined data by the known S-Z transform.

Specifically, at step S1003, the product of the predetermined coefficient data B1 and the content of the calculation register Cy (Cp in the case of the pitch direction, and these registers store values determined at the preceding sampling) is subtracted from the content of the register Sy, and the result is set to a register Dy (Dp). At next step S1004, the product of the predetermined coefficient data A1 and the content of the register Cy is added to the product of the predetermined coefficient A0 and the content of the register Dy as a multiply and accumulate operation, and the final result is set to a register Oy (Op). Finally, at step S1005, the value of the register Dy is transferred to the register Cy for the next set of calculations, and the feedback calculations of the vibration correction unit are ended.

Returning to FIG. 8(B), after the aforementioned feedback calculations are completed at step S813, the flow proceeds to step S814. At step S814, the control waits for the third timer 132 in the lens-side control circuit 121 counting to a predetermined time T3. The time T3 corresponds to control intervals for the vibration correction unit.

When the value of the third timer 132 reaches T3, the flow proceeds to step S815. At step S815, the value of the register Oy, which is the result of the aforementioned feedback calculations, is transferred to the D/A converter 123 in FIG. 1 as DADATA. This causes electric current corresponding to the output value to be applied to the vibration correction unit (coils 303 and 304) through the driving circuit 124, thereby driving the vibration correcting lens 126 in the yaw direction based on the vibration sensor 112 output in the yaw direction. At subsequent step S816, the third timer 132 is reset to start counting in preparation for the next driving control of the vibration correction unit, and then the flow proceeds to step S843 to terminate the interrupt operation.

On the other hand, when Td is larger than T4 at step S809, the flow proceeds to step S817 since a series of processing such as feedback calculations cannot be completed in time for the timing for the next driving of the vibration correction unit. At step S817, the control waits until the third timer 132 counts to T3 to reach the timing for driving the vibration correction unit. Then, at step S818, the value of the register Oy which sets the driving amount of the vibration correction unit based on the previously received vibration data (or the average of a plurality of already received vibration data values or the like may be used) is transferred to the D/A converter 123 as DADATA to drive the vibration correction unit. When the control is ended, the flow proceeds to step S819 where the third timer 132 is reset, and then the same calculation processing as that in steps S810 to S813 described above is performed at step S820 to S823, and the content of the register Oy is again set. Finally, at step S843, the interrupt flag is cleared to end the interrupt processing.

Up to this point, the embodiment has been described.

According to the aforementioned embodiment, when a temporary delay occurs in transmission of vibration data which essentially should be performed at regular intervals from the camera 129 to the lens unit 130, due to some reason in terms of the balance between the transmission and another operation, the lens unit 130, for example, can support the delay (at step S818 in FIG. 8(B) and step S837 in FIG. 9, the previously received vibration data is used to drive the vibration correction unit) by communicating the delay time data of transmission together with the vibration data (at steps S605 and 613 in FIG. 6). Thus, deteriorated accuracy of the control for vibration correction can be prevented.

The time data transmitted together with the vibration data may be data indicating the point in time to be transmitted, rather than the data indicating the delay time period. In this event, a delay time after the predetermined timing at which the data should be essentially transmitted is calculated from the relationship between the current data on the point in time and the previous data on the point in time.

In addition, while the present embodiment has been described for the vibration gyro used as the vibration sensor, the means for detecting vibrations is not limited to a mechanical sensor such as a gyro, and may detect vibrations from an image fetched by an area sensor or the like.

As described above, according to the present invention, a camera system capable of preventing deteriorated accuracy of vibration correction can be provided even when vibration data cannot be transmitted to the optical apparatus at regular intervals.

In the aforementioned embodiment, the description has been made about a camera system comprising a camera and an interchangeable lens unit including a vibration correction unit. The present invention, however, can adapt to a camera system comprising a camera integrally having an image-taking lens and a vibration correction unit being attachable to the image-taking lens. In addition, the present invention can adapt to a vibration correction unit being attachable to an interchangeable lens unit.

While preferred embodiment has been described, it is to be understood that modification and variation of the present invention may be made without departing from the sprit or scope of the following claims.

What is claimed is:

1. A camera system comprising:
   a camera having a vibration detection unit which detects vibration; and
   a vibration correction unit which is attachable to said camera and has a vibration correction optical system which corrects image vibration and a driving control circuit which drives said vibration correction optical system based on a vibration detection signal from said vibration detection unit,
   wherein said camera intermittently transmits the vibration detection signal from said vibration detection unit and time-related data to said driving control circuit, and said driving control circuit receives said vibration detection signal and said time-related data.

2. The camera system according to claim 1, wherein said driving control circuit drives said vibration correction optical system based on a previously received vibration detection signal or a currently received vibration detection signal selected on the basis of said received time-related data.

3. The camera system according to claim 2, wherein said time-related data is time data which represents a delay time period after a predetermined timing at which said camera should essentially transmit said vibration detection signal to said driving control circuit, and said driving control circuit drives said vibration correction optical system based on said currently received vibration detection signal when said time data is equal to or smaller than a predetermined value, and drives said vibration correction optical system based on said previously received vibration detection signal when said time data is larger than the predetermined value.

4. The camera system according to claim 1, wherein said vibration correction unit and said driving control circuit are included in an interchangeable lens unit which is attachable to said camera and has an image-taking optical system.

5. A camera system comprising:
   a camera having a vibration detection unit which detects vibration; and
   an interchangeable lens unit which is attachable to said camera and has a vibration correction optical system which corrects image vibration and a driving control circuit which drives said vibration correction optical system based on a vibration detection signal from said vibration detection unit,
   wherein said camera intermittently transmits the vibration detection signal from said vibration detection unit and time-related data to said driving control circuit, and said driving control circuit receives said vibration detection signal and said time-related data.

6. The camera system according to claim 5, wherein said driving control circuit drives said vibration correction optical system based on a previously received vibration detection signal or a currently received vibration detection signal selected on the basis of said received time-related data.

7. The camera system according to claim 6, wherein said time-related data is time data which represents a delay time period after a predetermined timing at which said camera should essentially transmit said vibration detection signal to said driving control circuit, and said driving control circuit drives said vibration correction optical system based on said currently received vibration detection signal when said time data is equal to or smaller than a predetermined value, and drives said vibration correction optical system based on said previously received vibration detection signal when said time data is larger than the predetermined value.

8. A vibration correction unit attachable to a camera having a vibration detection unit which detects vibration, comprising:
   a vibration correction optical system which corrects image vibration; and
   a driving control circuit which drives said vibration correction optical system based on a vibration detection signal from said vibration detection unit,
   wherein said driving control circuit receives said vibration detection signal and time-related data transmitted intermittently from said camera.

9. The vibration correction unit according to claim 8, wherein said driving control circuit drives said vibration correction optical system based on a previously received vibration detection signal or a currently received vibration detection signal selected on the basis of said received time-related data.

10. The vibration correction unit according to claim 9, wherein said time-related data is time data which represents a delay time period after a predetermined timing at which said camera should essentially transmit said vibration detection signal to said driving control circuit, and said driving control circuit drives said vibration correction optical system based on said currently received vibration detection signal when said time data is equal to or smaller than a predetermined value, and drives said vibration correction optical system based on said previously received vibration detection signal when said time data is larger than the predetermined value.

11. The vibration correction unit according to claim 8, wherein said vibration correction unit and said driving control circuit are included in an interchangeable lens unit which is attachable to said camera and has an image-taking optical system.

12. An interchangeable lens attachable to a camera having a vibration detection unit which detects vibration, comprising:
- a vibration correction optical system which corrects image vibration; and
- a driving control circuit which drives said vibration correction optical system based on a vibration detection signal from said vibration detection unit,
- wherein said driving control circuit receives said vibration detection signal and time-related data transmitted intermittently from said camera.

13. The interchangeable lens according to claim 12, wherein said driving control circuit drives said vibration correction optical system based on a previously received vibration detection signal or a currently received vibration detection signal selected on the basis of said received time-related data.

14. The interchangeable lens according to claim 13, wherein said time-related data is time data which represents a delay time period after a predetermined timing at which said camera should essentially transmit said vibration detection signal to said driving control circuit, and said driving control circuit drives said vibration correction optical system based on said currently received vibration detection signal when said time data is equal to or smaller than a predetermined value, and drives said vibration correction optical system based on said previously received vibration detection signal when said time data is larger than the predetermined value.

15. A camera to which a vibration correction unit or an interchangeable lens can be attachable, said vibration correction unit or said interchangeable lens having a vibration correction optical system which corrects image vibration and a driving control circuit which drives said vibration correction optical system, said camera comprising:
- a vibration detection unit which detects vibration; and
- a camera control circuit which intermittently transmits a vibration detection signal from said vibration detection unit and time-related data to said driving control circuit.

16. The camera according to claim 15, wherein said time-related data is time data which represents a delay time period after a predetermined timing at which said camera control circuit should essentially transmit said vibration detection signal to said driving control circuit.

* * * * *